United States Patent
Tao et al.

(10) Patent No.: US 11,265,799 B2
(45) Date of Patent: Mar. 1, 2022

(54) METHOD AND DEVICE FOR MESH ROUTING IN A CHANNEL-DIVERSE MESH NETWORK

(71) Applicant: AGENCY FOR SCIENCE, TECHNOLOGY AND RESEARCH, Singapore (SG)

(72) Inventors: Ming-Hung Tao, Singapore (SG); Yugang Ma, Singapore (SG); Ser Wah Oh, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 640 days.

(21) Appl. No.: 16/089,367

(22) PCT Filed: Mar. 29, 2017

(86) PCT No.: PCT/SG2017/050168
§ 371 (c)(1),
(2) Date: Sep. 27, 2018

(87) PCT Pub. No.: WO2017/171645
PCT Pub. Date: Oct. 5, 2017

(65) Prior Publication Data
US 2020/0305061 A1    Sep. 24, 2020

(30) Foreign Application Priority Data
Mar. 31, 2016  (SG) .......................... 10201602537W (51) Int. Cl.
*H04W 40/30* (2009.01)
*H04L 12/703* (2013.01)
(Continued)

(52) U.S. Cl.
CPC ............. *H04W 40/30* (2013.01); *H04L 45/28* (2013.01); *H04W 40/244* (2013.01); *H04W 84/18* (2013.01)

(58) Field of Classification Search
None
See application file for complete search history.

(56) References Cited

U.S. PATENT DOCUMENTS

| 2005/0119006 A1 | 6/2005 | Cave et al. |
| 2005/0227624 A1 | 10/2005 | Hiddink et al. |
| (Continued) | | |

FOREIGN PATENT DOCUMENTS

CN    104581735 A    4/2015

OTHER PUBLICATIONS

PCT International Search Report for PCT Counterpart Application No. PCT/SG2017/050168, 4 pgs. (dated May 9, 2017).
(Continued)

*Primary Examiner* — James P Duffy
(74) *Attorney, Agent, or Firm* — Womble Bond Dickinson (US) LLP (57) ABSTRACT

Embodiments of the invention relate to low-cost and low-complexity mesh routing method to provide connectivity within a channel-diverse mesh network in which there is no common channel available for the whole network and in which a single transceiver is provided in each node. The mesh routing method includes a procedure for flooding radio resource maps (RRMs), a procedure for determining the operating channel for each mesh node device, a routing procedure for establishing a route for a pair of source device and destination device, and a maintenance procedure for repairing routes and optimize selection of operating channel.

16 Claims, 8 Drawing Sheets

(51) Int. Cl.
*H04W 40/24* (2009.01)
*H04L 45/28* (2022.01)
*H04W 84/18* (2009.01)

(56) References Cited

U.S. PATENT DOCUMENTS

2006/0067283 A1* 3/2006 So ............... H04W 72/044
 370/338
2009/0323611 A1 12/2009 Singh et al.
2011/0047291 A1* 2/2011 Ishii ............... H04L 45/123
 709/238
2011/0149899 A1 6/2011 Le
2014/0254540 A1 9/2014 Kim et al.

OTHER PUBLICATIONS

PCT Written Opinion of the International Searching Authority for PCT Counterpart Application No. PCT/SG2017/050168, pp. 4 pgs. (dated May 9, 2017).

Z. Song, et al., "Improved ant routing algorithm in cognitive radio networks," 9$^{th}$ International Symposium on Communications and Information Technology, pp. 110-114 (Sep. 30, 2009).

* cited by examiner

METHOD AND DEVICE FOR MESH ROUTING IN A CHANNEL-DIVERSE MESH NETWORK

CROSS-REFERENCE TO RELATED APPLICATIONS

This patent application is a U.S. National Phase Application under 35 U.S.C. § 371 of International Application No. PCT/SG2017/050168, filed on 29 Mar. 2017, entitled METHOD AND DEVICE FOR MESH ROUTING IN A CHANNEL-DIVERSE MESH NETWORK, which claims the benefit of priority from Singapore Patent Application No. 10201602537W, filed on 31 Mar. 2016.

FIELD

The invention relates to providing or forming a self-organized mesh network in which more than one channel or frequency is used across the entire mesh network, and each communication node is equipped with only one transceiver.

BACKGROUND

Internet of Things (IoT) is one of the most focused information and communications technology (ICT) industries in recent years. The success of IoT relies on its ability to support a large number of nodes and to cover an extended area. Wireless mesh network can support both these aspects even under the condition that few data or power points are available. However, for a large mesh network, it is unlikely to apply a single channel to the entire area covering the mesh network. Parts of the mesh network may be compelled to use other channels due to presence of interference, other networks or even noise. Maintaining connectivity under such conditions is challenging.

Channel selection and routing are fundamental to providing or forming a channel-diverse wireless mesh network, and both these aspects are normally considered together in applying a holistic solution to the channel-diverse mesh network. Routing in cognitive radio networks (CRN) may be able to be applied directly as the routing part solution of a channel-diverse wireless mesh network. Conventional CRN routing algorithms exist. While these algorithms with single-path routing and channel selection could be used in the channel-diverse wireless mesh network, they require several strong assumptions, such as, multiple transceivers are required, common control channel is required, or Global Positioning System (GPS) information flooding is required. Multiple transceivers will increase costs as well as complexity of a communication device. Multiple transceivers will also increase power consumption requirements of the communication device and therefore multiple transceivers will not be suitable for small sensor devices. Common control channel is not practical because it reduces spectrum utilization efficiency and, further, a regulation-free control channel may not be available. Furthermore, GPS information flooding will also increase the control overheads as well as kill or reduce the device storage and also requires GPS function to be installed in each node device.

Accordingly, at least in view of the above-described assumptions, conventional CRN routing algorithms are not suitable for large-scale mesh deployment which is typically needed for IoT applications.

To develop a low-cost and low-complexity mesh algorithm for a large-scale mesh network, one or more of the above-described assumptions have to be addressed or eliminated. Mesh routing methods that avoid using any of the above-described assumptions do exist and may be a possible solution for large-scale mesh deployment. However, these existing mesh routing methods do not perform channel selection before routing decision, and this approach would necessarily result in a huge amount of control overheads because each routing request message has to be flooded in every channel and has to carry the channel status information for each passed node. The time required for establishing routes in existing methods is also longer because the time for which a routing request message takes to reach its destination is prolonged due to the frequent channel switching.

In view of the above and other issues with existing routing methods, a low-cost and low-complexity mesh routing method for a large-scale mesh network is highly desirable.

SUMMARY

In a first aspect of the invention, a mesh routing method operative in a channel-diverse mesh network having a plurality of nodes is provided. The method comprises:
  computing, by a particular node, weighted values for available channels for the particular node based on beacon messages broadcasted by neighbour nodes;
  based on the weighted values, determining, by the particular node, one of the available channels as temporary operating channel; and
  based on a pre-determined criteria relating to at least one subsequently-determined temporary operating channel, determining, by the particular node, the same one of the available channels as an operating channel for the particular node.

In one embodiment of the first aspect, the method further comprises:
  receiving, by the particular node, a Routing Request (RREQ) message from a sending node, which includes information relating to the source node and a destination node;
  based on the information relating to the source node and the destination node, establishing, by the particular node, a reverse route to the sending node;
  transmitting, by the particular node, the RREQ message to any receiving node having an available channel being the operating channel of the particular node;
  receiving, by the particular node, a Routing Response (RRSP) message generated by the destination node in response to the RREQ message; and
  transmitting, by the particular node, the RRSP message based on the reverse route and establishing a forward route for the particular node based on the RRSP message.

In a second aspect of the invention, a mesh node device comprises:
  a single transceiver configured to receive beacon messages from neighbour nodes and transmit messages;
  a memory storage configured to store the beacon messages;
  a channel selector configured to:
    compute weighted values for available channels for the mesh node device based on the beacon messages;
    based on the weighted values, determining one of the available channels as temporary operating channel; and
    based on a pre-determined criteria relating to at least one subsequently-determined temporary operating channel, determining the same one of the available channels as an operating channel for the mesh node device.

In one embodiment of the second aspect, the transceiver is configured to: receive a Routing Request (RREQ) message from a sending node, which includes information relating to a source node and a destination node; the device further comprises:

a mesh routing executor configured to: establish a reverse route to the sending node based on the information relating to the source node and the destination node, wherein the transceiver is configured to:
transmit the RREQ message to any receiving node having an available channel being the operating channel of the mesh node device;
receive a Routing Response (RRSP) message generated by the destination node in response to the RREQ message; and
transmit the RRSP message based on the reverse route, wherein the mesh routing executor is configured to:
establish a forward route for the mesh node device based on the RRSP message.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiment, the terms "first", "second" and "third", etc. are used merely as labels, and are not intended to impose numerical requirements on their objects.

In the context of various embodiments, the terms "source", "destination", "intermediate", "receiving", "sending", "broadcasting", "neighbour", "connected", "advisor", "accepting", "particular", etc. when used in combination with the term "node" are used merely as labels to describe function, relationship, and/or status of a node; they may be interchangeably used to refer to a same node or different nodes depending on the context.

Figure 1:
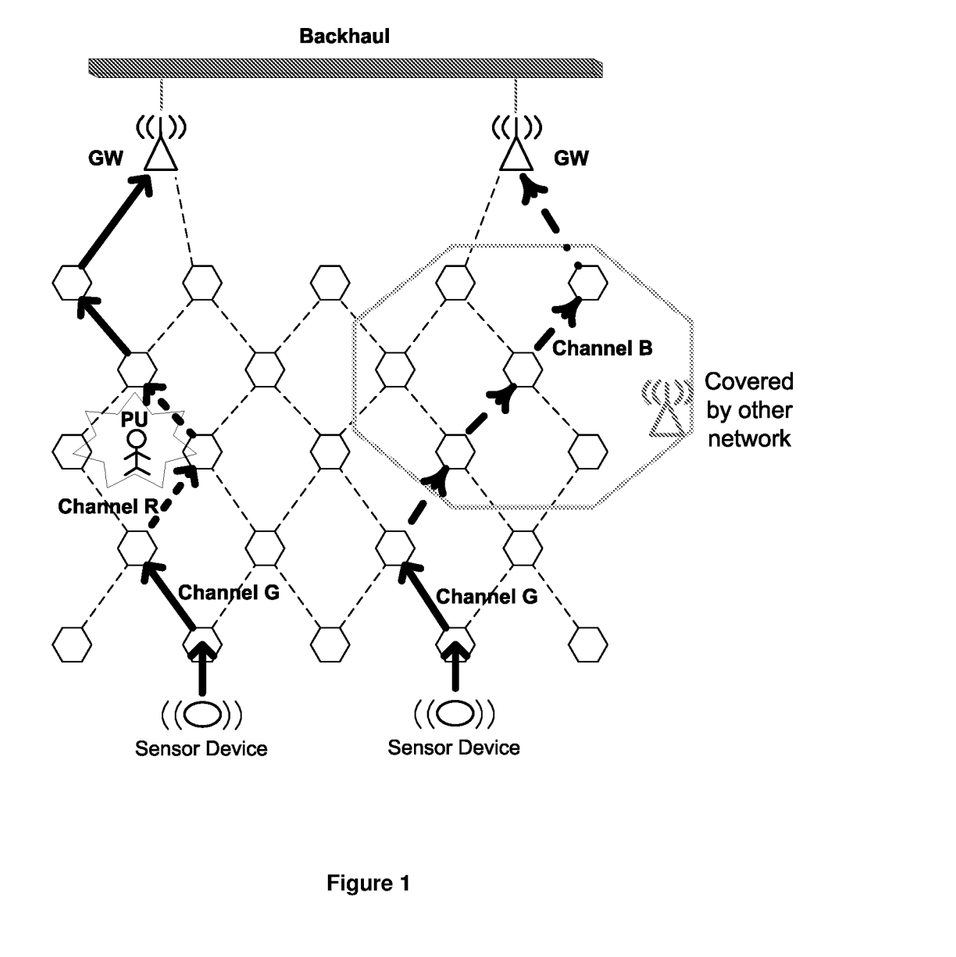
FIG. 1 shows an IoT mesh network with different channel allocations in different areas.

In a large-scale IoT mesh network, having reliable connections and having low-cost devices are two key factors to make IoT applications successful. To maintain connections in a large area, single frequency network is no longer feasible because of the presence of primary users, other technologies, interference, and even noise, as shown in FIG. 1. Accordingly, a mesh routing method of the invention provides for channel selection and routing decision to allow more than one channel appearing in a routing path. To support low-cost devices, the mesh routing method has to avoid assuming that devices are capable of spectrum sensing, are equipped with multiple transceivers, or have to store the location information of all other devices.

FIG. 1 shows a channel-diverse mesh network having a plurality of nodes wherein each node includes a mesh node device which may be wired or wireless. In the example of FIG. 1, sensor devices are connected via a series of nodes include gateway nodes (GW) to a backhaul which connects to the Internet.

Figure 8:
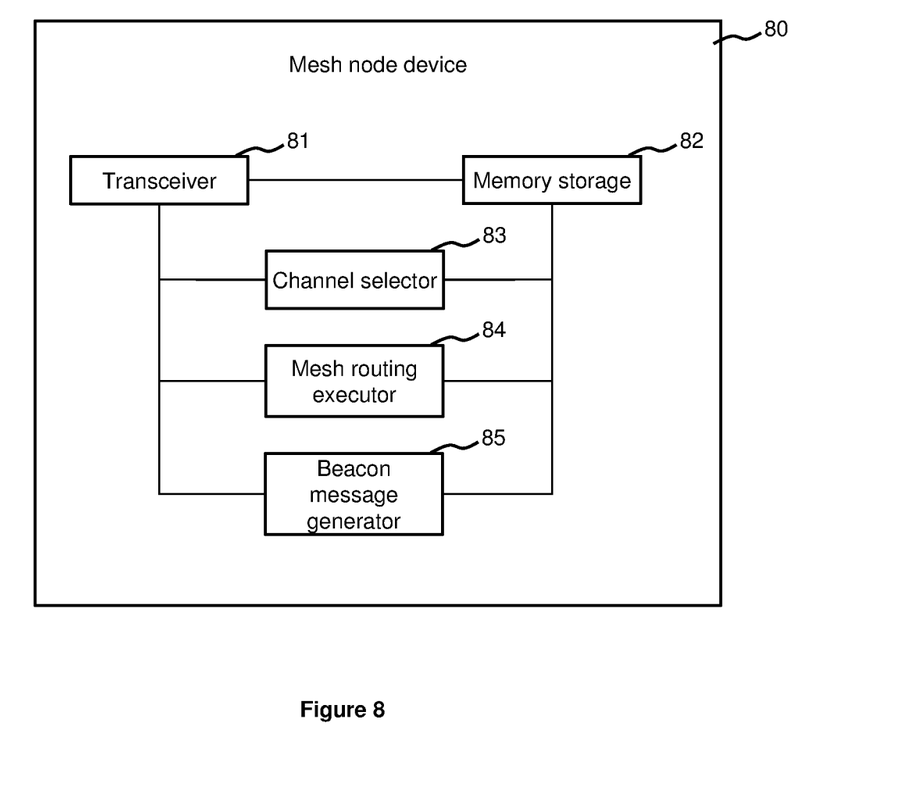
FIG. 8 is a schematic representation of one example of a mesh node device.

FIG. 8 is a schematic representation of one example of a mesh node device 80 which may be deployed in a channel-diverse mesh network as any of the mesh nodes. The mesh node device 80 includes a single (only one) transceiver 81 for receiving and transmitting messages or data, a memory storage 82 for storing messages or data or information, a channel selector 83, a mesh routing executer 84, a beacon message generator 85, and other appropriate components. As shown in FIG. 8, each of the transceiver 81 and memory storage 82 is communicably coupled to the remaining components 83, 84, 85, but it is to be appreciated that other connection arrangements are equally possible.

The self-organized channel-diverse mesh routing method implemented in each of the node is able to connect the source node and the destination node of a traffic stream with the routing path constituting of multiple links, and each link uses its own channel. The self-organized channel-diverse mesh routing method of the invention includes at least four parts or procedures.

The first part is an optional procedure for flooding Radio Resource Maps (RRMs) during the initialization phase. The mesh node could obtain the list of available channels via gathering and analysing the beacon messages, e.g. beacon frames, and the radio resource message broadcast by its neighbouring nodes. The beacon message, e.g. beacon frame, indicates when and at which channel the neighbouring node will start broadcasting the radio resource message. The mesh node that has determined its operational channel could also start broadcasting the beacon message as well as the radio resource message.

The second part is a procedure for determining the operating channel for each device. In particular, the mesh routing method determines the operational channel of the mesh node by periodically gathering and analysing the beacon messages broadcasted by its neighbour nodes. The mesh node stays at its operational channel to receive incoming packets and switches to the operational channels of other nodes to transmit outgoing packets.

The third part is a routing procedure for determining a route for a pair of source device and destination device. In particular, the source node of a traffic stream generates a routing request message and floods it to the destination node if the route between the source node and destination node has not been established. The intermediate mesh node receiving the routing request message records the reversed route to the source node and forwards the message to its neighbour nodes that are able to reply to the intermediate node later. The destination node which has received the routing request message sends back a routing response message to the source node through the reversed route. The intermediate mesh node receiving the routing response message builds the forward route to the destination node and sends back the routing response message through the reversed route.

The fourth part is an optional maintenance procedure used to repair routes and optimize selection of operating channel. In particular, the destination node could suggest the operational channels for other mesh nodes by embedding the suggestions in the routing response message. The mesh node which accepts the suggestion has to notify other nodes about this change.

The details of these four parts or procedures are set out in the following description.

a. Flooding Radio Resource Maps (RRMs)

For a node being a mesh node device which has no spectrum sensing ability, the node may obtain its available channels by querying a back-end RRM database server or a Geo-Location Database (GLDB). For a node being a mesh node device which has a wired connection to the Internet, querying the RRM database does not pose an issue. However, for other nodes which can only rely on wireless link to transmit and receive data, a protocol is required for these nodes to obtain the available channels before these nodes establish wireless links.

Figure 3:
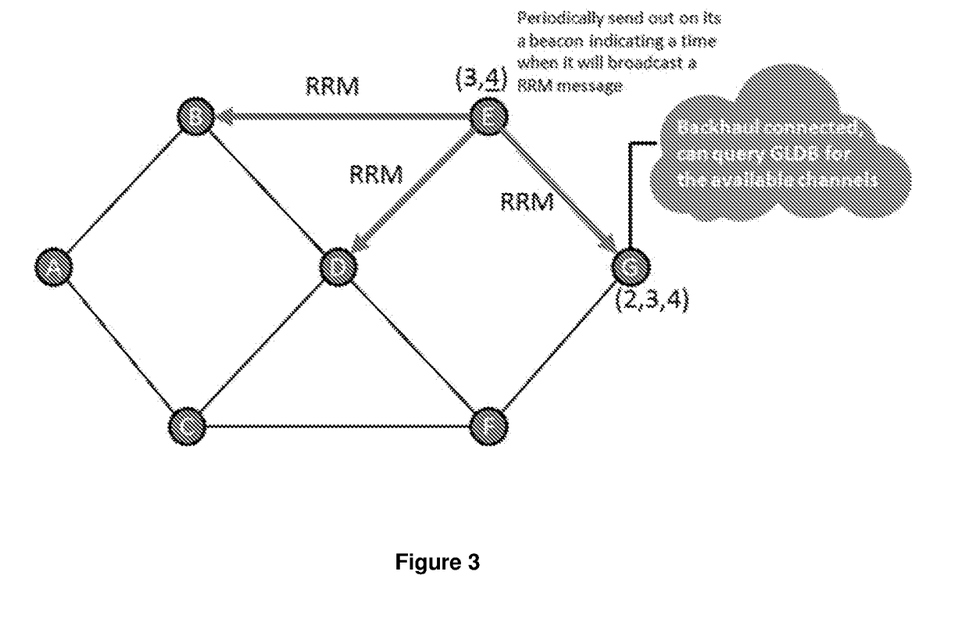
FIG. 3 shows the mesh network of FIG. 2, in which node E determines its operational channel and starts RRM broadcasting procedure.
Figure 7A:
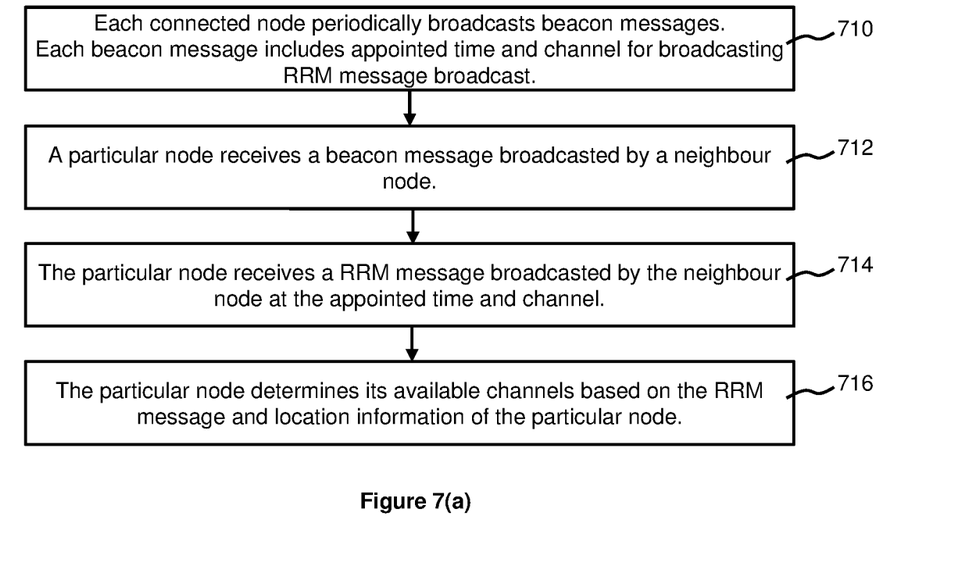
FIG. 7(a) is a flow chart describing a RRM flooding procedure.

Reference is made to FIG. 7(a) which illustrates a RRM flooding procedure according to one embodiment of the invention, FIG. 3 which illustrates an example of a RRM flooding procedure, and FIG. 8 which illustrates a schematic representation of one example of a mesh node device which may be employed in this procedure.

In block 710, each node, which is connected to the Internet or backhaul and therefore has access to a back-end RRM database server or GLDB, periodically broadcasts beacon messages, e.g. beacon frames, while the node remains in the connected state. This is a common assumption in either time division multiple access (TDMA) or carrier sense multiple access (CSMA) based radio access technology. Each beacon message is embedded with an indication identifying an appointed time and channel at which the node, that generates the beacon message, will broadcast RRM messages.

In a mesh node device 80 employed at the connected node, the beacon message generator 85 generates the beacon messages and the transceiver 81 broadcasts the beacon messages.

Figure 2:
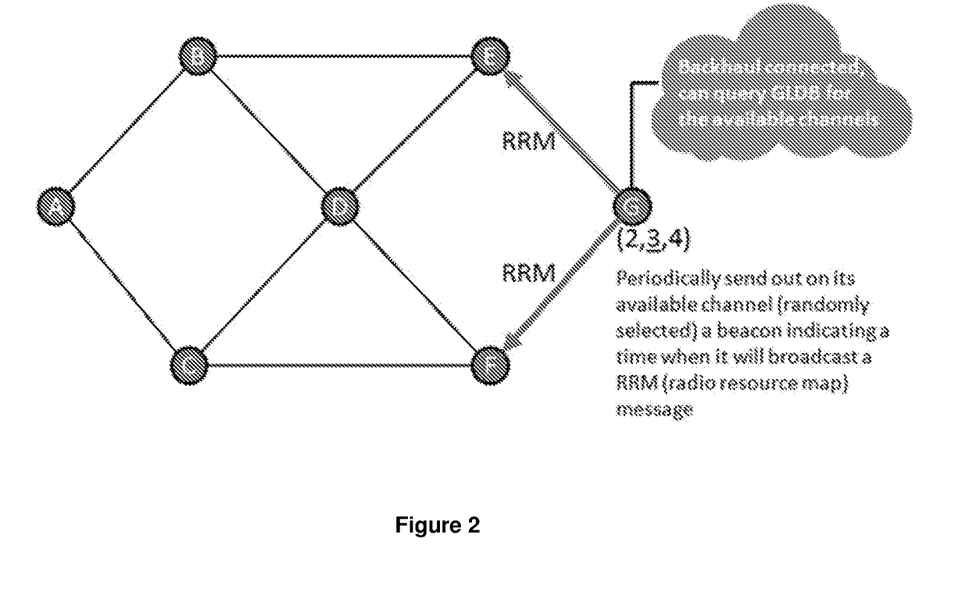
FIG. 2 shows a mesh network in which node G is connected to the Internet and indicates the timing of RRM broadcast in its beacon message.

In block 712, a particular node which may have just powered on, e.g. node E in FIG. 2, scans the whole channels and obtains or receives beacon messages broadcasted by neighbouring connected nodes, e.g. node G.

In a mesh node device 80 employed at the particular node, the transceiver 81 receives the beacon messages which may be stored in a memory storage 82.

In block 714, after receiving a broadcasted beacon message from node G, the particular node, e.g. node E, stays at the appointed channel, e.g. channel 3, at the appointed time as identified in the received beacon message, and obtains or receives a RRM message broadcasted by the neighbour node, e.g. node G.

In a mesh node device 80 employed at the particular node, the transceiver 81 receives the RRM message which may be stored in the memory storage 82.

In block 716, the particular node, e.g. node E, determines or derives its list of available channels based on the received RRM message and its location information which may be preset as the default configuration at the time of deployment.

After the available channels are determined, the particular node, e.g. node E, determines its temporary operating channel and operating channel, e.g. non-temporary operating channel, based on the channel selection procedure described in the second part of the mesh routing method.

After channel selection, the particular node, e.g. node E, will start broadcasting beacon messages periodically at the operating channel, e.g. channel 4 in the example of FIG. 3 as well as RRM messages.

In a mesh node device 80 employed at the particular node, the channel selector 83 determines the available channels (based on RRM message and preset location stored in the memory storage 82), the temporary operating channel(s) and the operating channel. The beacon message generator 85 generates beacon messages. The transceiver 81 transmits or broadcasts the beacon messages.

If the particular node, e.g. node E, is unable to obtain any RRM message at the appointed time indicated by the received beacon message, it will repeat the procedure of obtaining or receiving beacon frame which identifies time and channel information of RRM broadcast.

In addition to identifying, within the beacon message, an appointed time and channel at which the connected node will broadcast RRM messages, the beacon message may also include other information such as available channels, temporary operational channel and (non-temporary) operating channel of the node which generated and transmitted the beacon message. At least one of this information will be employed in later parts of the mesh routing method.

b. Determining or Selecting Operating Channel

After a particular node has obtained the RRM message and derived its available channels, the particular node will commence a procedure for determining the operating channel, firstly, by determining a temporary operating channel and, secondly, by determining a non-temporary operating channel.

Figure 4A:
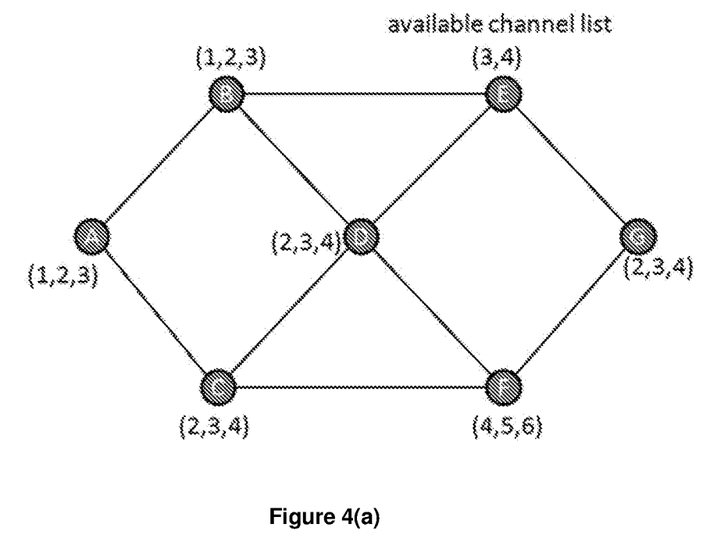
FIG. 4(a) shows node deployment with the initial available channels listed for each node.
Figure 4B:
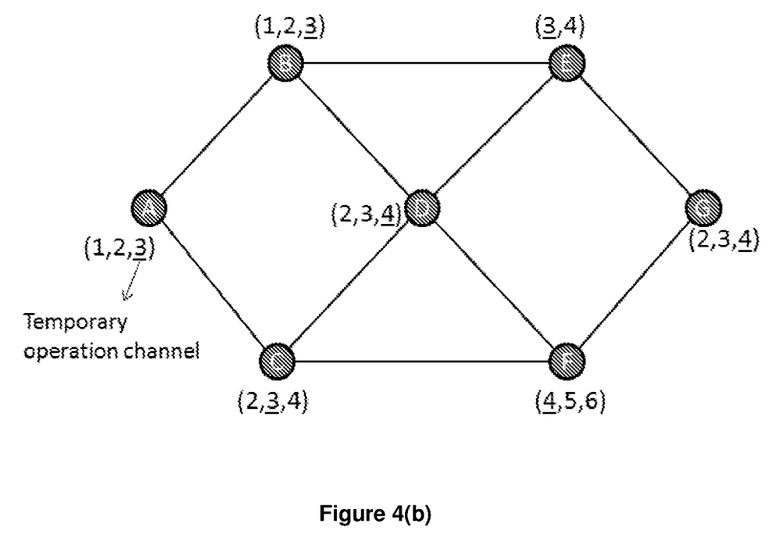
FIG. 4(b) shows a temporary operating channel determined by each node after a round of channel-determining procedure.
Figure 4C:
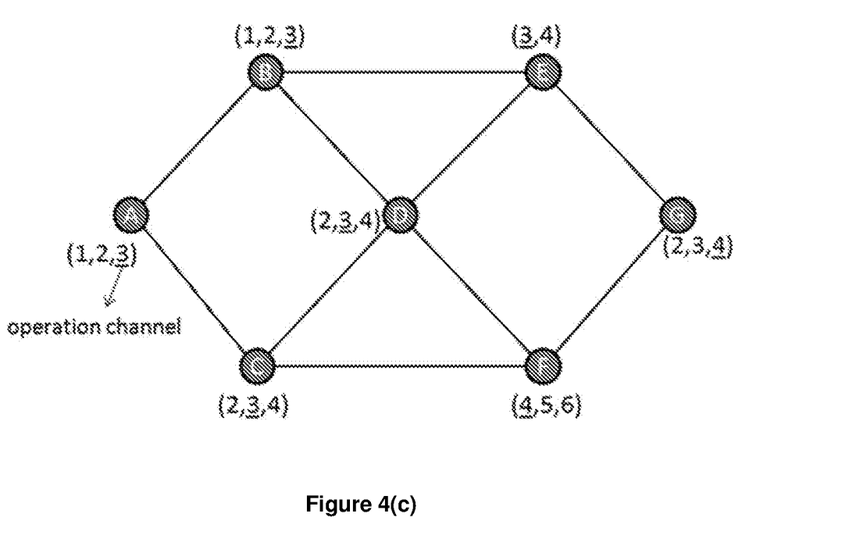
FIG. 4(c) shows a real operating channel determined by each node after several rounds of channel-determining procedure.
Figure 7B:
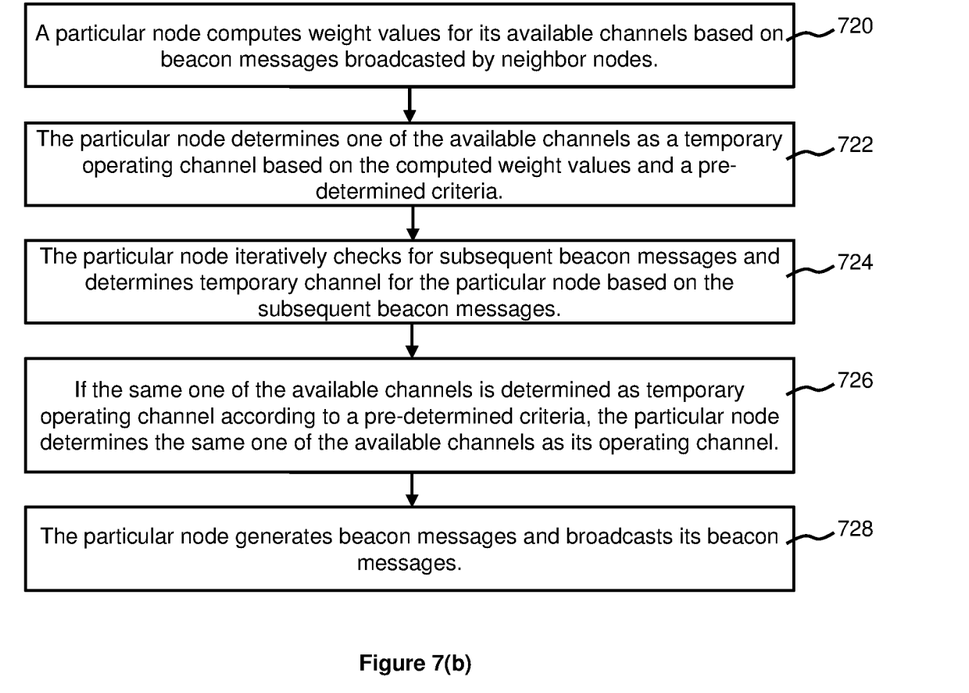
FIG. 7(b) is a flow chart describing a channel selection or determination procedure.

Reference is made to FIG. 7(b) which illustrates a channel determination or selection procedure according to one embodiment of the invention, FIGS. 4(a) to 4(c) which illustrate an example of a channel determination procedure, and FIG. 8 which illustrates a schematic representation of one example of a mesh node device which may be employed in this procedure.

In block 720, for each available channel for a particular node, the particular node computes a corresponding weighted value, e.g. score, based on beacon messages received from neighbour nodes. It is assumed that each beacon message broadcasted by a neighbour node includes a list of available channels, temporary operating channel and operating channel of the particular neighbour node.

In a mesh node device 80 employed at the particular node, the channel selector 83 computes the weighted values and stores the various weighted values in the memory storage 82.

In block 722, based on the computed weighted values and a pre-determined criteria, e.g. highest weighted value or score, the particular node determines one of the available channels which satisfies the criteria as its temporary operating channel.

In a mesh node device 80 employed at the particular node, the pre-determined criteria may be stored in the memory storage 82. The channel selector 83 determines the temporary operating channel.

In block 724, the particular node iteratively checks for subsequent beacon messages from its neighbour nodes and determines its temporary operational channel for each time it checks based on the subsequent beacon messages.

In a mesh node device 80 employed at the particular node, the transceiver 81 iteratively receives subsequent beacon messages which may be stored in the memory storage 82. The channel selector 83 determines the subsequent temporary operating channel(s).

In block 726, if the same available channel is determined as temporary channel according to a pre-determined criteria, e.g. at least two continuous times, that particular available channel is determined as operating channel, i.e. non-temporary operating channel, for the particular node. In other words, a temporary operating channel is assigned as a non-temporary channel after being determined as temporary operating channel according to a pre-determined criteria relating to at least one subsequently-determined temporary operating channel, e.g. a pre-determined number of times.

In a mesh node device 80 employed at the particular node, the pre-determined criteria may be stored in the memory storage 82. The channel selector 83 determines the (non-temporary) operating channel.

In block 728, after operating channel is determined, the particular node, e.g. node E, generates beacon messages and broadcasts its beacon messages periodically at the operating channel, e.g. channel 4 in the example of FIG. 3. The particular node also broadcasts its RRM messages.

In a mesh node device 80 employed at the particular node, the beacon message generator 85 generates the beacon messages and RRM messages. The transceiver 81 broadcasts the beacon messages and RRM messages.

An example of weight assignment and computation in a channel determination procedure is described as follows:

If a channel appears as an available channel of a neighbour node, score += 1
If a channel appears as a temporary operating channel of a neighbour node, score += 2
If a channel appears as an operating channel of a neighbour node, score += 3

In this example, temporary operating channel of node j is denoted by $C_j$, and determined according to a series of equations below:

Temporary operating channel, $C_j = \arg\max f_j(x)$, where $$f_j(x) = \sum_{\substack{i \in j \text{ or} \\ \text{neighbors of } j}} g_i(x), \text{ where}$$

$$g_i(x) = \begin{cases} 3, & \text{if } x = \text{operating channel of node } i \\ 2, & \text{if } x = \text{temporary operating channel of node } i \\ 1, & \text{if } x \in \{\text{available channel list}\} \text{ of node } i \\ 0, & \text{otherwise} \end{cases}$$

It is to be appreciated that the weight values assigned to the $g_i(x)$ in the above equations are sample values for illustrative purpose only and may be appropriately adjusted in other examples. It is also to be appreciated that other equations may be appropriately applied in other examples to define the criteria for determining a temporary operating channel.

An example to illustrate the channel determination or selection procedure is shown in FIGS. 4(a) to 4(c). FIG. 4(a) shows various nodes A to G having determined their respective available channels. The available channels for each node are indicated in brackets. Each node computes a weighted value for each of its available channels and determines its temporary operating channel based on the computed weighted values and a pre-determined criteria for selection of temporary operating channel. After one round of determination, the temporary operating channel for each node is determined and indicated by the underlined number in FIG. 4(b). Subsequently, after a pre-determined number of rounds, the (non-temporary) operating channel for each node is determined and indicated by the underlined number in FIG. 4(c).

After a particular node has determined its temporary operating channel, the particular node has to stay at that channel to receive any possible incoming data packets if the particular node is not transmitting data packets, i.e. in non-transmission mode.

On the other hand, if the particular node is in transmission mode, the particular node will transmit data packets to a receiving node at the operating channel of the receiving node if that operating channel is also one of the available channels for the particular node.

In an alternative embodiment, a node is allowed to have more than one operating channel, and each operating channel partially occupies the total duration of the non-transmission state.

c. Conducting Multi-Channel Routing

Figure 5:
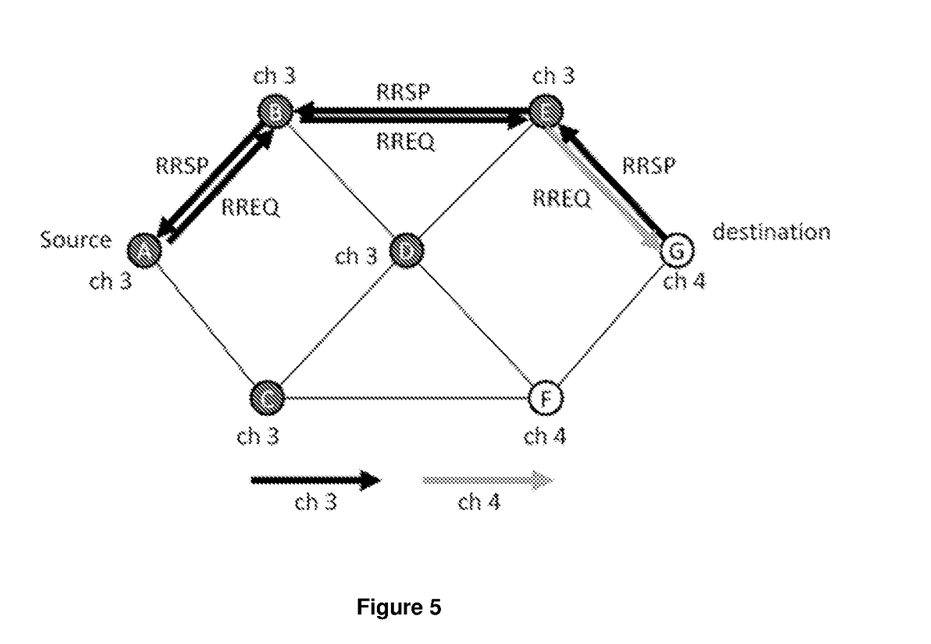
FIG. 5 shows node A floods a RREQ message to node G, and node G sends back a RREP message to establish a routing path between node A and node G.
Figure 7C:
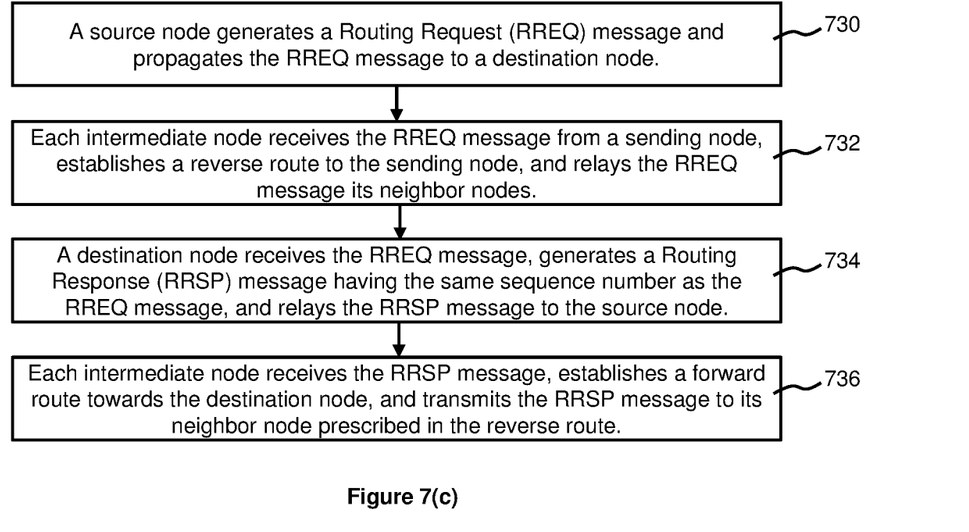
FIG. 7(c) is a flow chart describing a multi-channel routing procedure.

Reference is made to FIG. 7(c) which illustrates a routing procedure according to one embodiment the invention, and to FIG. 5 which illustrates an example of a routing procedure, and FIG. 8 which illustrates a schematic representation of one example of a mesh node device which may be employed in this procedure. The routing procedure will be triggered if there is no established route between the source node of a data stream and the destination node.

In block 730, a source node, e.g. node A in FIG. 5, generates a Routing Request (RREQ) message and propagates it to the destination node, e.g. node G in FIG. 5. The RREQ message may include information relating to the source node and the destination node, and a sequence number assigned to or identifying the RREQ message. According to the routing procedure, only those nodes which have determined their temporary operating channels are allowed to transmit or relay RREQ messages.

In a mesh node device 80 employed at the source node, the mesh routing executor 84 generates RREQ message and the transceiver 81 propagates it to the destination node.

In block 732, an intermediate node, e.g. node B in FIG. 5, receives the RREQ message from a sending node, e.g. source node or other intermediate node. Assuming the RREQ message is a fresh message which has not been previously-received by the particular intermediate node, e.g. node B, the intermediate node records the sequence number of the RREQ message as well as the information relating to the source node and the destination node. Thereafter, the particular intermediate node, e.g. node B, establishes a reverse route to the sending node of the RREQ message, e.g. node A, and transmits or relays the RREQ message to its neighbour nodes, e.g. node E. For onward transmission of the RREQ message, the intermediate node will only forward the RREQ message to a neighbour or receiving node having an available channel being the operating channel of the particular intermediate node, e.g. node B, by checking beacon message of the receiving node for its available channels.

In a mesh node device 80 employed at the intermediate node, the transceiver 81 receives the RREQ message. The mesh routing executor 84 records the sequence number of the RREQ message as well as the information relating to the source node and the destination node, and establishes a reverse route to the sending node of the RREQ message. The transceiver 81 transmits or relays the RREQ message to its neighbour nodes.

Before establishing the reverse route, the particular intermediate node, e.g. node B, ascertains whether this particular RREQ message is a fresh message. To this purpose, the intermediate node checks a sequence number of this particular RREQ message against sequence numbers of previously-received RREQ messages. If the sequence number of this particular RREQ message is the same as a sequence number of any previously-received RREQ message, this particular RREQ message is not a fresh RREQ message and will be disregarded. However, if the sequence number of this particular RREQ message does not match any sequence number of any previously-received RREQ message, this particular RREQ message is a fresh RREQ message.

In a mesh node device 80 employed at the intermediate node, the mesh routing executor 84 checks a sequence number of this particular RREQ message against sequence numbers of previously-received RREQ messages and determines whether or not to disregard the RREQ message.

The procedure of block 732 may be performed at each intermediate node receiving the RREQ message.

In block 734, in response to receiving the RREQ message reaches at destination node, the destination node generates a Routing Response (RRSP) message with a sequence number which is same as that in the RREQ message. The destination node sends the RRSP message all the way back to the source node.

In a mesh node device 80 employed at the destination node, the mesh routing executor 84 generates the RRSP message with the same sequence number as the RREQ message. The transceiver 81 transmits the RRSP message to the source node.

In block 736, based on the received RRSP message, each intermediate node establishes a forward route to the destination node, and transmits the RRSP message to its neighbour node, as prescribed in the reverse route established previously in block 732, together with the RREQ message of the same sequence number.

In a mesh node device 80 employed at the intermediate node, the mesh routing executor 84 establishes a forward route to the destination node. The transceiver 81 transmits the RRSP message to its neighbour node prescribed in the reverse route.

d. Optimizing Channel Selection and Repairing Routes

According to one embodiment of the invention, the destination node may further be an advisor node which is capable of suggesting operating channels to other nodes in an established route while sending the RRSP message back to the source node. As the destination node would have better knowledge about the route, it will be able to optimize channel selection for that routing path. It is to be noted that changing the operating channel of a certain node may affect other existing routing paths passing that node.

Figure 6A:
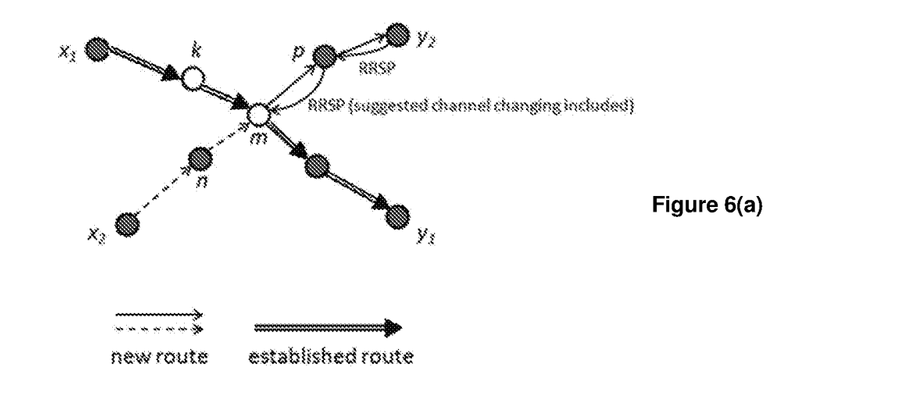
FIG. 6(a) shows node $y_2$ suggests node m to change its operating channel by sending a RRSP message while building the route from node $x_2$ to node $y_2$.
Figure 6B:
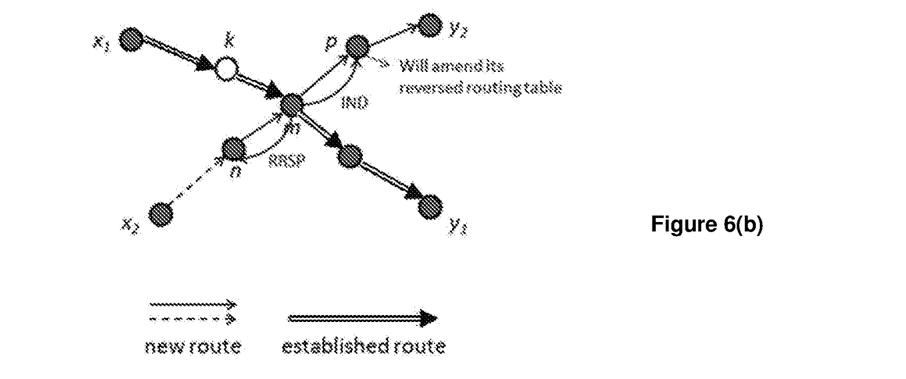
FIG. 6(b) shows node m accepts the suggestion of node $y_2$ and sends both an IND message and the RRSP message to its neighbours to indicate its acceptance of the suggested change.
Figure 6C:
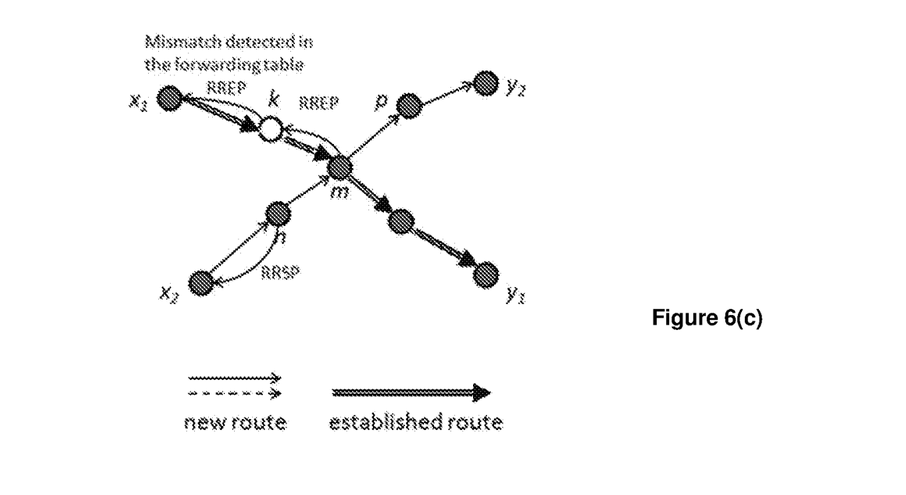
FIG. 6(c) shows node m also sends an RREP message to the source node of another route from node $x_1$ to node $y_1$ to trigger routing repair procedure in this other route.

Reference is made to FIG. 7($d$) which illustrates a channel selection optimization and route repair procedure according to one embodiment the invention, FIGS. 6($a$) to 6($c$) which illustrates an example of a channel selection optimization and route repair procedure, and FIG. 8 which illustrates a schematic representation of one example of a mesh node device.

Figure 7D:
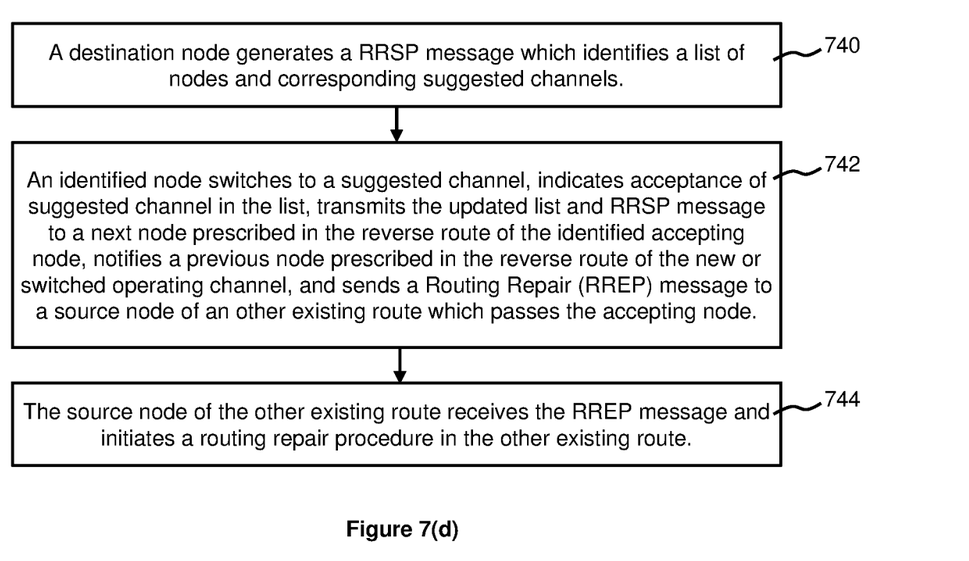
FIG. 7(d) is a flow chart describing channel selection optimization and route repair procedure.

In block 740, a destination node, e.g. node $y_2$, of a first route, e.g. from node $x_2$ to node $y_2$, generates a RRSP message which additionally identifies a list of nodes, e.g. node m, which the destination node has determined to provide suggestions and the suggested operating channel for each identified node.

In a mesh node device 80 employed at the destination node of the first route, the mesh routing executor 84 generates the RRSP message which additionally identifies the list of nodes and corresponding suggested operating channel.

In block 742, if the RRSP message is received at one of the identified nodes in the RRSP message, e.g. node m, and if the identified node, e.g. node m, accepts the suggestion, e.g. suggested channel, the identified accepting node, e.g. node m, switches to the suggested operating channel, indicates its acceptance in the list and transmits the updated list together with the RRSP message to a next node, e.g. node n, which is prescribed in the reverse route of the accepting node. The identified accepting node, e.g. node m, sends an indication (IND) message to its previous node, e.g. node p, which is prescribed in the reverse route of the accepting node, to notify the previous node of the switch in its operating channel. The previous node, e.g. node p, amends its reverse route based on the switched operating channel. Further, the accepting node, e.g. node m, sends a Routing Repair (RREP) message to the source node of another existing route, e.g. a second route from node $x_1$ to node $y_1$ which passes the accepting node, e.g. node m.

In a mesh node device 80 employed at the identified node, the channel selector 83 accepts and switches to the suggested new operating channel. The mesh routing executor 84 updates the RRSP message. The transceiver 81 transmits the indication message to the previous node and the RREP message to the source node, e.g. node $x_1$, of the second route.

In block 744, the source node of the second route receives the RREP message and detects a mismatch in the forward route. In response to the detected mismatch, the source node triggers or initiates a routing repair procedure in the second route. In particular, the source node generates and propagates a new RREQ message to establish its route to its destination node.

In a mesh node device 80 employed at the source node of the second route, the mesh routing executor 84 generates a new RREQ message. The transceiver 81 transmits the RREQ message to the destination node of the second route.

Considering the example illustrated in FIG. 6(*a*), an existing routing path $x_1$ to $y_1$ passes node m, and a new routing request sent by $x_2$ has reached its destination node $y_2$. In this example, only nodes m and k are operating in channel 'b', other nodes are operating in channel 'a'. If node $y_2$ decides to suggest to node m to switch its operating channel from 'b' to 'a', it indicates this suggestion in a RRSP message and sends the RRSP message back to the source node. If node m accepts the suggestion, node m switches the operating channel immediately after receiving the RRSP message and sends an IND message to node p as shown in FIG. 6(*b*). Node m also marks its acceptance of channel switching in the RRSP message and send the updated RRSP message to node n as shown in FIG. 6(*b*). Meanwhile, node m will send an RREP message all the way back to node $x_1$, the source node of another existing route, so that node $x_1$ may trigger routing repair procedure, as shown in FIG. 6(*c*) in this other existing route.

It is to be appreciated that the various procedures described above may be employed independent of one another. Alternatively, any one of the various procedures may be employed in combination with at least one of the remaining procedures. For example, a mesh network may employ the above-described procedures for determining or selecting operating channel, and multi-channel routing.

Embodiments of the invention provide advantages including but not limited to the following. A low-cost and low-complexity mesh routing method provides connectivity within a channel-diverse mesh network while there is no common channel available for the whole network. The mesh routing method involving the channel selection part and the routing decision part is capable of supporting mesh node devices with only one transceiver. The mesh routing method is capable of adapting to frequent changes to the spectrum allocation/usage, and is further capable of maintaining the connectivity while still guaranteeing the throughput and Quality of Service (QoS) requirement for users. Accordingly, the invention provides a cost-effective and practical solution because it only requires single transceiver in each node. No GPS information forwarding, no spectrum sensing, and no common channel is required.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

What is claimed is:

1. A mesh routing method operative in a channel-diverse mesh network having a plurality of nodes, the method comprising:
   receiving, by a particular node, beacon messages broadcasted by neighbour nodes wherein each of the beacon messages identifies a respective time and channel information of Radio Resource Map (RRM) broadcast;
   based on a location of the particular node and a RRM message received by the particular node at an appointed time and channel according to one of the beacon messages, determining, by the particular node, available channels for the particular node;
   computing, by the particular node, weighted values for the available channels for the particular node based on available channels, temporary operating channel and operating channel of each of the neighbour nodes, which are further identified in the beacon messages broadcasted by neighbour nodes;
   based on the weighted values, determining, by the particular node, one of the available channels as temporary operating channel; and
   based on a pre-determined criteria relating to at least one subsequently-determined temporary operating channel, determining, by the particular node, the same one of the available channels as an operating channel for the particular node.

2. The method of claim 1, further comprising:
   receiving, by the particular node, a Routing Request (RREQ) message from a sending node, which includes information relating to the source node and a destination node;
   based on the information relating to the source node and the destination node, establishing, by the particular node, a reverse route to the sending node;
   transmitting, by the particular node, the RREQ message to any receiving node having an available channel being the operating channel of the particular node;
   receiving, by the particular node, a Routing Response (RRSP) message generated by the destination node in response to the RREQ message; and
   transmitting, by the particular node, the RRSP message based on the reverse route and establishing a forward route for the particular node based on the RRSP message.

3. The method of claim 2, wherein before establishing, by the particular node, a reverse route for the sending node of the RREQ message, the method further comprising:
   checking, by the particular node, a sequence number of the RREQ message against a sequence number of any previously-received RREQ message; and
   disregarding the RREQ message if the sequence number of the RREQ message and the sequence number of any previously-received RREQ message are the same.

4. The method of claim 2, further comprising:
   receiving, by the particular node, data packets using the operating channel; and
   transmitting, by the particular node, data packets to a receiving node using an operating channel for the receiving node, which is any one of the available channels for the particular node.

5. The method of claim 2, wherein receiving, by the particular node, a RRSP message generated by the destination node includes receiving, by the particular node, the RRSP message generated by the destination node which is associated with a first route, wherein the RRSP message identifies at least one node being the particular node and a suggested operating channel thereof, the method further comprising:
switching, by the particular node, to the suggested operating channel; and
notifying, by the particular node, a sending node of the RRSP message of the switching to the suggested operating channel,
wherein transmitting, by the particular node, the RRSP message based on the reverse route includes transmitting, by the particular node, the RRSP message which further identifies a switched operating channel for the particular node.

6. The method of claim 5, further comprising:
generating, by the particular node, a Routing Repair (RREP) message and transmitting the RREP message to a source node associated with a second route which includes the particular node.

7. The method of claim 6, further comprising:
receiving, by the source node associated with the second route, the RREP message; and
based on the RREP message, initiating, by the source node associated with the second route, route repair procedure in the second route.

8. The method of claim 1, further comprising:
broadcasting, by any node connected to a RRM database, the beacon messages wherein the each of the beacon messages includes information on available channels, temporary operating channel and operational channel of the any node connected to the RRM database.

9. The method of claim 1, wherein after determining, by the particular node, the same one of the available channels as an operating channel for the particular node, the method further comprising:
broadcasting, by the particular node, other beacon messages at the operating channel.

10. A mesh node device comprising:
a single transceiver configured to receive beacon messages from neighbour nodes and transmit messages wherein each of the beacon messages identifies a respective time and channel information of Radio Resource Map (RRM) broadcast, and determine the available channels for the mesh node device based on a location thereof and a RRM message received by the mesh node device at an appointed time and channel according to one of the beacon messages;
a memory storage configured to store the beacon messages;
a channel selector configured to:
compute weighted values for the available channels for the mesh node device based on available channels, temporary operating channel and operating channel of each of the neighbour nodes, which are further identified in the beacon messages;
based on the weighted values, determine one of the available channels as temporary operating channel; and
based on a pre-determined criteria relating to at least one subsequently-determined temporary operating channel, determine the same one of the available channels as an operating channel for the mesh node device.

11. The device of claim 10, wherein the transceiver is configured to:
receive a Routing Request (RREQ) message from a sending node, which includes information relating to a source node and a destination node;
the device further comprising:
a mesh routing executor configured to: establish a reverse route to the sending node based on the information relating to the source node and the destination node, wherein the transceiver is configured to:
transmit the RREQ message to any receiving node having an available channel being the operating channel of the mesh node device;
receive a Routing Response (RRSP) message generated by the destination node in response to the RREQ message; and
transmit the RRSP message based on the reverse route,
wherein the mesh routing executor is configured to: establish a forward route for the mesh node device based on the RRSP message.

12. The device of claim 11, wherein the mesh routing executor is configured to:
before determining a reverse route for the sending node of the RREQ message, check a sequence number of the RREQ message against a sequence number of any previously-received RREQ message; and disregard the RREQ message if the sequence number of the RREQ message and the sequence number of any previously-received RREQ message are the same.

13. The device of claim 11, wherein the transceiver is configured to:
receive data packets using the operating channel; and
transmit data packets to a receiving node using an operating channel for the receiving node, which is any one of the available channels for the mesh node device.

14. The device of claim 11, wherein the transceiver is configured to:
receive the RRSP message generated by the destination node which is associated with a first route, wherein the RRSP message identifies at least one node being the mesh node device and a suggested operating channel thereof,
wherein the mesh routing executor is configured to: switch to the suggested operating channel;
wherein the transceiver is configured to: notify a sending node of the RRSP message of the switch to the suggested operating channel; and
transmit the RRSP message which further identifies a switched operating channel for the mesh node device.

15. The device of claim 14, wherein the mesh routing executor is configured to:
generate a RREP message and transmit the RREP message to a source node associated with a second route which includes the mesh node device.

16. The device of claim 10, further comprising:
a beacon message generator configured to:
after determining the same one of the available channels as an operating channel for the particular node, generate other beacon messages wherein each of the other beacon messages includes information on available channels, temporary operating channel and operational channel of the mesh node device; and
wherein the transceiver is configured to: broadcast the other beacon messages to neighbour nodes at the operating channel.

* * * * *